(12) United States Patent
Driant et al.

(10) Patent No.: US 11,420,701 B2
(45) Date of Patent: Aug. 23, 2022

(54) MIRROR ASSEMBLY FOR A HANDLEBAR OF A VEHICLE

(71) Applicant: BOMBARDIER RECREATION PRODUCTS INC., Valcourt (CA)

(72) Inventors: Thomas Driant, Saint-Denis-de-Brompton (CA); Kevin Cyrenne, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 229 days.

(21) Appl. No.: 16/597,602

(22) Filed: Oct. 9, 2019

(65) Prior Publication Data

US 2020/0247497 A1 Aug. 6, 2020

Related U.S. Application Data

(60) Provisional application No. 62/799,477, filed on Jan. 31, 2019.

(51) Int. Cl.
| | |
|---|---|
| *B62J 29/00* | (2006.01) |
| *B62K 21/00* | (2006.01) |
| *B62K 21/12* | (2006.01) |
| *B62J 23/00* | (2006.01) |

(52) U.S. Cl.
CPC .............. *B62J 29/00* (2013.01); *B62J 23/00* (2013.01); *B62K 21/00* (2013.01); *B62K 21/12* (2013.01)

(58) Field of Classification Search
CPC .................................. B62J 29/00; B62K 21/00
See application file for complete search history.

(56) References Cited

U.S. PATENT DOCUMENTS

| | | | | |
|---|---|---|---|---|
| 4,715,681 A | * | 12/1987 | Johnson | B62J 6/20 359/526 |
| 2003/0072093 A1 | * | 4/2003 | Preis | B62J 29/00 359/842 |
| 2016/0070084 A1 | * | 3/2016 | Owyang | G02B 7/182 359/842 |
| 2017/0015378 A1 | * | 1/2017 | Takakuwa | F21S 43/14 |
| 2019/0126828 A1 | * | 5/2019 | Chen | B62J 29/00 |

(Continued)

OTHER PUBLICATIONS

Screen captures from YouTube video clip entitled "How To: Honda Grom Bar End Mirrors Install!," 6 pages, uploaded on Apr. 27, 2018 by user "Blockhead". Retrieved from Internet: <https://www.youtube.com/watch?v=feCD2RQ-cNU&feature=youtu.be>.

(Continued)

*Primary Examiner* — Minnah L Seoh
*Assistant Examiner* — Marlon A Arce
(74) *Attorney, Agent, or Firm* — BCF LLP

(57) ABSTRACT

A mirror assembly for a handlebar of a vehicle has a stem assembly and a mirror connect to the stem assembly. The stem assembly includes a base, a stem connected to the base, and a clamp connected to and extending from the base. The clamp is adapted for being disposed inside a handle of the handlebar. The base, the stem and the clamp are integral. The clamp defines a ramp. A threaded fastener inserted through the base and extends in part in the clamp. A nut engages the threaded fastener, and at least a portion of the nut abuts the clamp. Translating the nut toward the base by rotating the fastener causes the nut to move over the ramp thereby deflecting the ramp.

20 Claims, 16 Drawing Sheets

(56) References Cited

U.S. PATENT DOCUMENTS

| | | | |
|---|---|---|---|
| 2019/0225292 A1* | 7/2019 | Lee | B62J 29/00 |
| 2019/0283830 A1* | 9/2019 | Li | G02B 7/182 |
| 2021/0061392 A1* | 3/2021 | Lee | B62J 29/00 |

OTHER PUBLICATIONS

Screen captures from YouTube video clip entitled "how to install bar end mirrors" 3 pages, uploaded on Mar. 30, 2015 by user "GSXR Rider22". Retrieved from Internet: <https://www.youtube.com/watch?v=u17B6-2ll3k&feature=youtu.be>.

KAWELL RearView Side Mirror Round Bar End Convex Hawk-eye Motorcycle Mirror For 7/8" Handle Bars [online]. Amazon, Aug. 23, 2014 [retrieved on Sep. 16, 2020]. Retrieved from the Internet: <URL: https://www.amazon.ca/KAWELL-Hawk-eye-Motorcycle-Davidsons-Kawasaki/dp/B002GTKAHQ/ref=sr_1_4?ie=UTF8&qid=1544471562&sr=8-4&keywords=bar+end+mirrors>.

* cited by examiner

MIRROR ASSEMBLY FOR A HANDLEBAR OF A VEHICLE

CROSS-REFERENCE

The present application claims priority to U.S. Provisional Patent Application No. 62/799,477, filed Jan. 31, 2019, the entirety of which is incorporated herein by reference.

TECHNICAL FIELD

The present technology relates to mirror assemblies for handlebars of vehicles.

BACKGROUND

Handlebar assemblies for straddle-seat vehicles and the like are well known. Handlebars of some such assemblies are connected to rearview mirror assemblies to enable pivoting of the rearview mirrors with the handlebar when the vehicle is being steered. This mirror configuration is often deemed desirable for practical and ergonomic considerations.

In some known mirror assemblies, the mirror is connectable to a handle of the handlebar via a stem. The stem is adapted to be rotatable with the mirror relative to the handle so as to position the mirror, fine adjustments notwithstanding, according to considerations such as handlebar position relative to the straddle seat, driver build and driver comfort. In some such assemblies, tightening a clamping mechanism allows to clamp the stem onto the handle, supporting the mirror in a given desired position relative to the handle. This process conventionally involves tightening a fastener (e.g., a screw or the like) of the clamping mechanism.

In such mirror assemblies, tightening of the clamping mechanism is also typically intended to hinder rotation of the stem relative to the handle, away from the given desired position. During use of the vehicle under normal operating conditions, rotation of the stem relative to the handle may occur nonetheless as a result of operating loads borne by such assemblies. Such loads may arise from vehicle acceleration or deceleration, collisions against the stem or the mirror, and vibrations originating from the powertrain, the flow of air around across the vehicle or the wheels of the vehicle. Such vibrations may propagate to the handlebar and, ultimately, to the clamping mechanism. It has been observed that the clamping mechanism may be prone to loosening when exposed to such vibrations and, as a result, may unexpectedly give way to rotation of the stem relative to the clamping mechanism and/or the handle.

On the other hand, it is desirable that such mirror assemblies be adapted such that rotation of their stem relative to the handle is unhindered under specific circumstances. For example, in many jurisdictions mirror assemblies must meet safety regulations that set out how they must deflect, collapse or break in response to predefined impacts. During such impact tests, clamping mechanisms of conventional mirror assemblies may, depending on their orientation with respect to the impact, tighten their clamping to the handle, thereby reducing their ability to rotate. In addition, when in use, overtightening of the clamping mechanism of known mirror assemblies may result in the stem resisting rotation under the rated loading conditions.

Therefore, a mirror assembly for a handlebar of a vehicle that addresses at least some of the above drawbacks is desired.

SUMMARY

It is an object of the present technology to ameliorate at least some of the inconveniences present in the prior art.

According to one aspect of the present technology, there is provided a handlebar assembly for a vehicle. The handlebar assembly comprises a handlebar adapted for connection to a steering column of the vehicle. The handlebar has first and second handles. The first and second handles are disposed at opposite ends of the handlebar. The first handle has an inner surface. The inner surface defines a cavity in the first handle. A stem assembly include a base engaging an end of the first handle, a stem having a first end connected to the base and a second end, the stem extending away from the base, and a clamp extending inside the cavity, the clamp defining a ramp, the ramp tapering as the ramp extends away from the base. The base, the stem and the clamp are integral. A threaded fastener is inserted through the base and extends in part in the cavity. A nut is disposed in the cavity, the nut engaging the threaded fastener, and at least a portion of the nut abutting the clamp, the nut being rotationally fixed relative to the clamp. The nut has at least a first position and a second position relative to the ramp. Rotation of the threaded fastener translates the nut between the first and second positions along an axis. The nut is closer to the base in the second position than in the first position. In the first position of the nut, the stem assembly is rotatable relative to the first handle. In the second position of the nut, the nut abuts the ramp and causes deflection of the ramp such that the clamp applies pressure against the inner surface of the first handle, and friction between the clamp and the inner surface of the first handle opposes rotation of the stem assembly relative to the first handle. A mirror is connected to the second end of the stem.

In some embodiments, the clamp has a first end connected to the base and a second free end and in the first position of the nut, the second free end of the clamp is radially spaced from the inner surface of the first handle.

In some embodiments, the base defines a groove and the end of the first handle is received in the groove.

In some embodiments, the ramp includes a first ramp surface and a second ramp surface. The first ramp surface is at a first angle relative to the axis. The second ramp surface is at a second angle relative to the axis. The second angle is greater than the first angle. The nut has a third position relative to the ramp, the third position of the nut being intermediate the first and second positions of the nut. In the third position of the nut, the nut abuts the first surface of the ramp and in the second position of the nut, the nut abuts the second surface of the ramp.

In some embodiments, the first angle is between 5 degrees and 10 degrees.

In some embodiments, the second angle is between 30 degrees and 85 degrees.

In some embodiments, the clamp includes at least one lip extending from the ramp and the nut abuts the at least one lip.

In some embodiments, the at least one lip of the clamp extends perpendicularly to the ramp.

In some embodiments, the ramp is a first ramp. The clamp defines at least one second ramp. The at least one second ramp tapers as the at least one second ramp extends away from the base. In the second position of the nut, the nut abuts the at least one second ramp and causes deflection of the at least one second ramp.

In some embodiments, the first ramp and the at least one second ramp are disposed circumferentially about the axis and are circumferentially spaced from each other.

In some embodiments, the at least one second ramp is a single second ramp. The first and second ramps are disposed on opposite sides of a plane passing through the axis. The nut is held between the first and second ramps.

In some embodiments, the mirror is connected to the second end of the stem via a ball joint.

In some embodiments, the handlebar assembly further comprises a grip disposed around the first handle, the clamp extending inside the grip.

In some embodiments, the grip is spaced from the base. The handlebar assembly further comprises a first handguard connector connected to the first handle between the base and a first end of the grip, a second handguard connector connected to the first handle, the grip being disposed between the first and second handguard connectors, and a handguard connected to the first and second handguard connectors and being radially spaced from the grip.

In some embodiments, the first handguard connector defines a first recess and a second recess. At least a portion of the base is received in the first recess and at least a portion of the grip is received in the second recess.

In some embodiments, the second position of the nut is a position of the nut being the closest to the base. In the second position of the nut, the nut is spaced from the base and the second position of the nut is a position of the nut causing maximum deflection of the ramp.

In some embodiments, the clamp has a first end connected to the base and a second free end and in a second position of the nut, a distance between the nut and the first end of the clamp is greater than a distance between the nut and the second free end.

In some embodiments, the clamp has a first end connected to the base, a second free end, a first portion extending between the first end and the ramp and a second portion extending between the ramp and the second free end.

In some embodiments, the stem assembly is made of plastic having a first hardness and the nut is made of a material having a second hardness, the second hardness being greater than the first hardness.

According to another aspect of the present technology, there is provided a vehicle. The vehicle comprises a vehicle body, a steering column operatively connected to the vehicle body and a handlebar assembly according to the above aspect of the present technology alone or in combination with any one of the above embodiments connected to the steering column.

According to another aspect of the present technology, there is provided a mirror assembly for a handlebar of a vehicle. The mirror assembly comprises a stem assembly including a base adapted for engaging an end of a handle of the handlebar. The stem has a first end connected to the base and a second end, the stem extending away from the base. A clamp has a first end connected to the base and a second free end, the clamp extending from the base. The clamp is adapted for being disposed inside a cavity defined by an inner surface of the handle. The clamp defines a ramp. The ramp tapers as the ramp extends away from the base. The base, the stem and the clamp are integral. A threaded fastener is inserted through the base and extends in part in the clamp. A nut engages the threaded fastener and at least a portion of the nut abuts the clamp. The nut is rotationally fixed relative to the clamp. The nut has at least a first position and a second position relative to the ramp. Rotation of the threaded fastener translates the nut between the first and second positions along an axis. The nut is closer to the base in the second position than in the first position. In the first position of the nut, the second free end of the clamp is at a first distance from the axis. In the second position of the nut, the nut abuts the ramp and causes deflection of the ramp such that the second free end of the clamp is at a second distance from the axis. The second distance is greater than the first distance. A mirror is connected to the second end of the stem.

For purposes of this application, terms related to spatial orientation such as forward, rearward, upward, downward, left, and right, as they are used in this document refer to general directions as would be understood by a driver of a vehicle sitting in a driver seat of the vehicle and facing in a straight forward driving direction. Terms related to spatial orientation when describing or referring to components or sub-assemblies of a vehicle separately from the vehicle should be understood as they would be understood when these components or sub-assemblies are mounted to the vehicle, unless specified otherwise in this application. The terms «proximal» and «distal» used when describing or referring to components or portions thereof should be understood in the frame of reference of the vehicle with respect to a longitudinal centerplane of the vehicle. For example, a proximal side of a component should be understood as being closer to the longitudinal centerplane of the vehicle than a distal side of the same component.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described herein with respect to a three-wheeled straddle-type vehicle 100. It is contemplated that the present technology could also be implemented in other vehicles steered via a handlebar such as, but not limited to, motorcycles, scooters, all-terrain vehicles (ATVs), personal watercrafts and snowmobiles.

Figure 1:
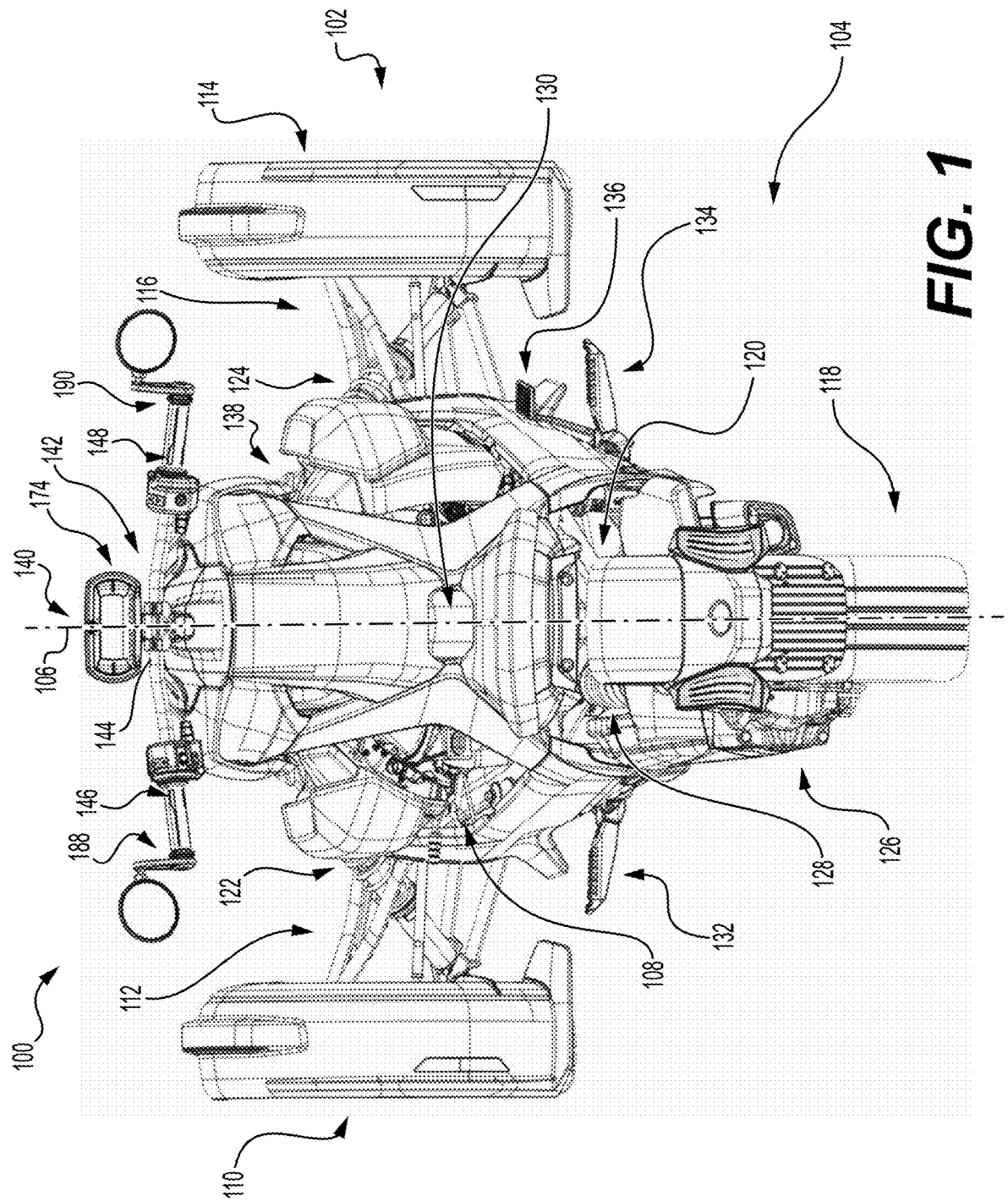
FIG. 1 is a rear, top perspective view of a vehicle.

With reference to FIG. 1, the vehicle 100 has a front end 102, a rear end 104, and a longitudinal centerplane 106 defined consistently with the forward travel direction of the vehicle 100. The vehicle 100 has a frame 108, a left front wheel 110 mounted to the frame 108 on a left side thereof by a left front suspension assembly 112, and a right front wheel 114 mounted to the frame 108 on a right side thereof by a right front suspension assembly 116. A single rear wheel 118 is mounted to the frame 108 at a rear end thereof by a rear suspension assembly 120. The left and right front wheels 110, 114 and the rear wheel 118 each have a tire secured thereto. The front wheels 110, 114 are disposed equidistant from the longitudinal centerplane 106, and the rear wheel 118 is centered with respect to the longitudinal centerplane 106.

In the illustrated embodiment, each front suspension assembly 112, 116 is a double A-arm type suspension, also known as a double wishbone suspension, and includes a corresponding shock absorber 122, 124. It is contemplated that other types of front suspensions, such as a McPherson strut suspension, or swing arm could be used. The rear suspension assembly 120 includes a swing arm 126 and a shock absorber 128. The shock absorber 128 is connected between the swing arm 126 and the frame 108. It is contemplated that other types of rear suspensions could be used.

The vehicle 100 has a straddle seat 130 mounted to an upper portion of the frame 108 and disposed along the longitudinal centerplane 106. In the illustrated embodiment, the straddle seat 130 is designed to accommodate a single adult-sized rider, i.e. the driver. It is contemplated that a seat having a driver portion and a passenger portion could be provided.

Left and right driver footrests 132, 134 are disposed on either side of the vehicle 100 to support the driver's feet. The driver footrests 132, 134 are connected to a lower portion of the frame 108. The driver footrests 132, 134 are in the form of foot pegs disposed forward of the straddle seat 130. It is also contemplated that the footrests 132, 134 could be in the form of footboards. It is contemplated that the vehicle 100 could also be provided with passenger footrests disposed rearward of the driver footrests 132, 134 on both sides of the vehicle 100, for supporting a passenger's feet when a passenger seat portion for accommodating a passenger is provided on the vehicle 100. A brake pedal 136 is operatively connected to a braking system (not shown) of the vehicle 100 for braking the vehicle 100. The brake pedal 136 extends upwardly and forwardly from the right driver footrest 134 such that the driver can actuate the brake pedal 136 with a front portion of the right foot while a rear portion of the right foot remains on the right driver footrest 134.

The vehicle 100 includes a power pack 138 (not shown in detail) which includes a motor and a transmission assembly (not shown). The power pack 138 is supported by and is housed in part within the frame 108. The transmission assembly includes a continuously variable transmission (CVT) and a transfer drive. The motor is in the form of an internal combustion engine. It is however contemplated that the motor could be other than an internal combustion engine, for example an electric motor, a hybrid or the like. It is also contemplated that the transmission assembly could be of another type. The motor is operatively connected to the rear wheel 118 via the transmission assembly to drive the rear wheel 118.

Figure 2:
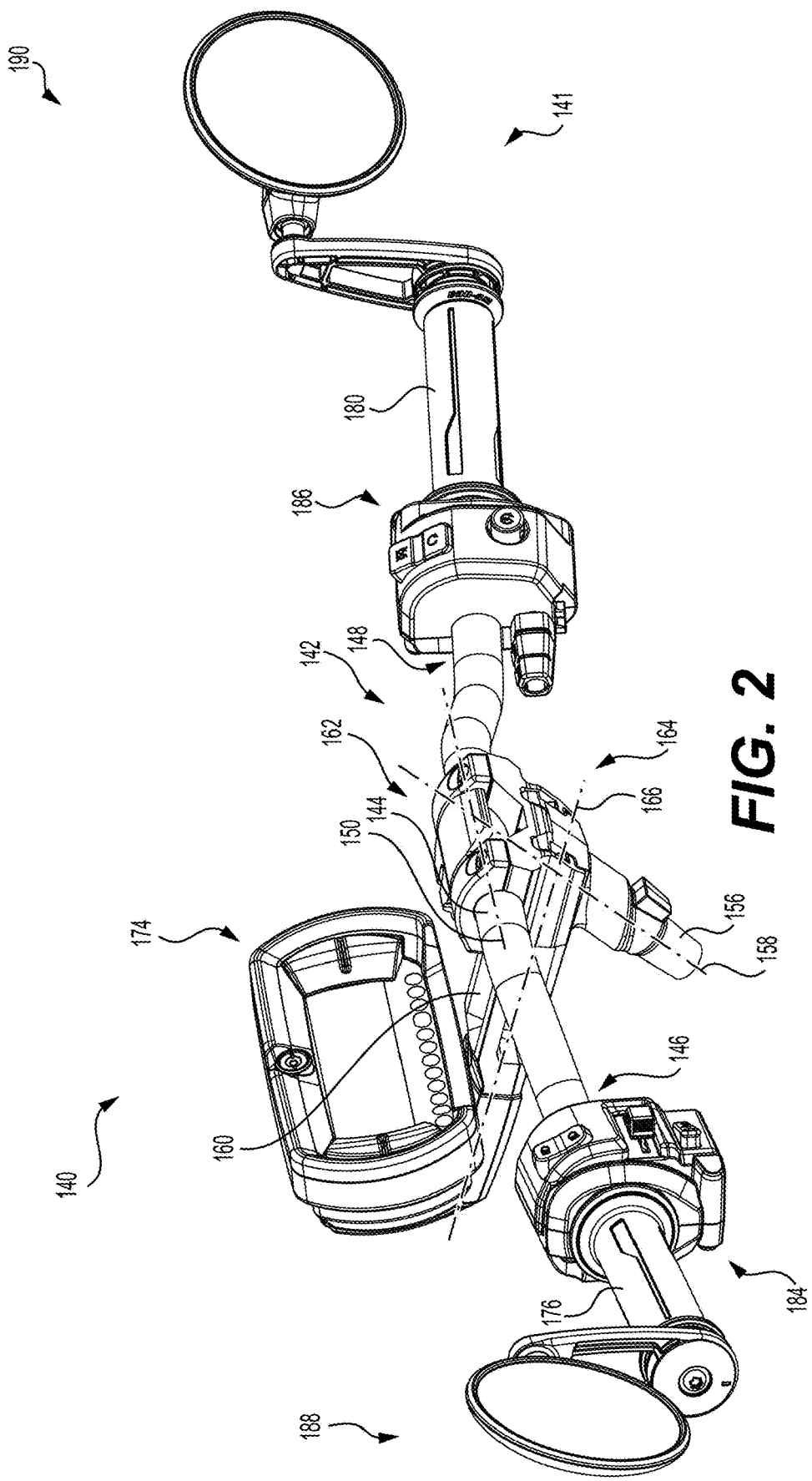
FIG. 2 is a rear, top, left side perspective view of a steering assembly of the vehicle of FIG. 1.
Figure 3:
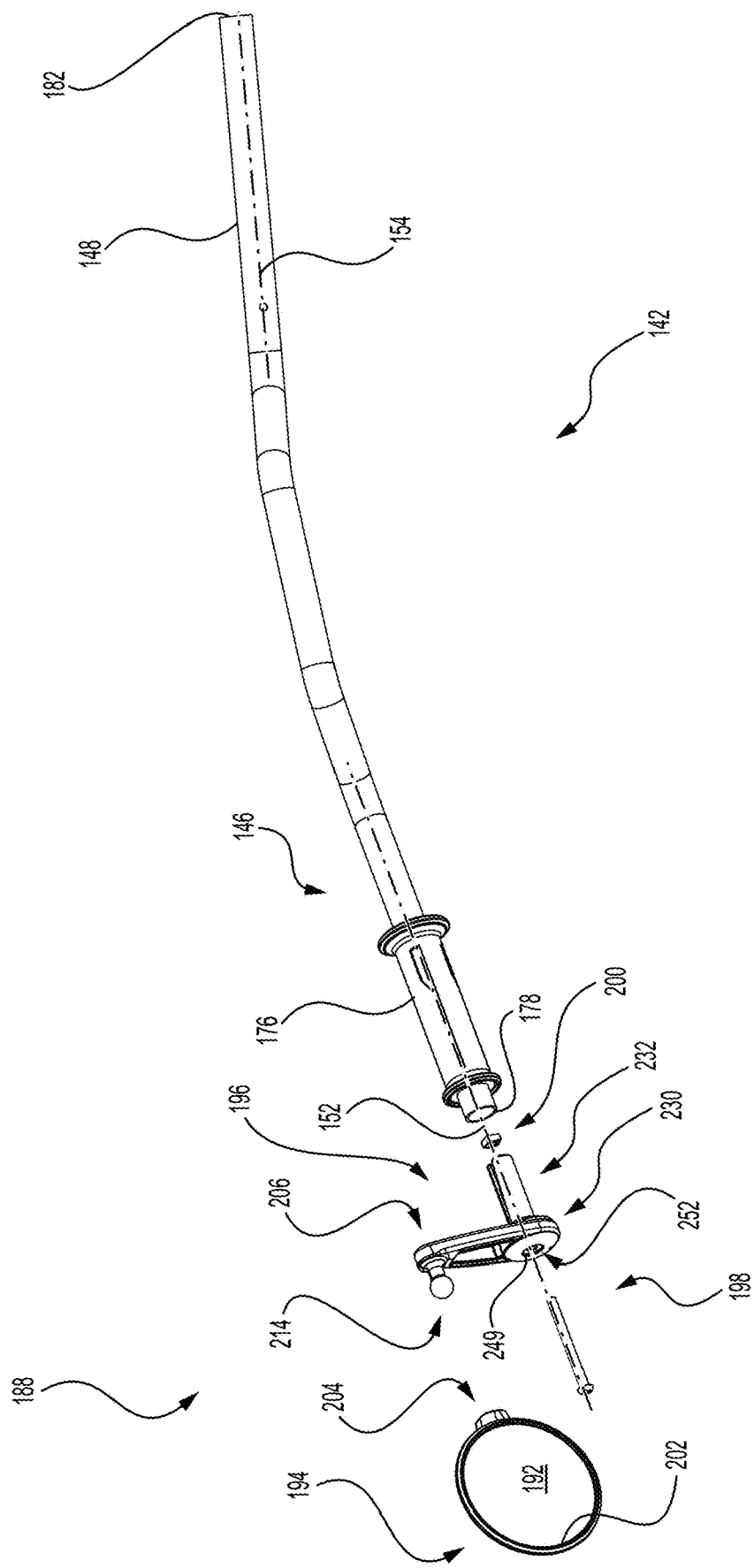
FIG. 3 is a rear, top, left side, partially exploded perspective view of a left side of a handlebar assembly of the steering assembly of FIG. 2.
Figure 5:
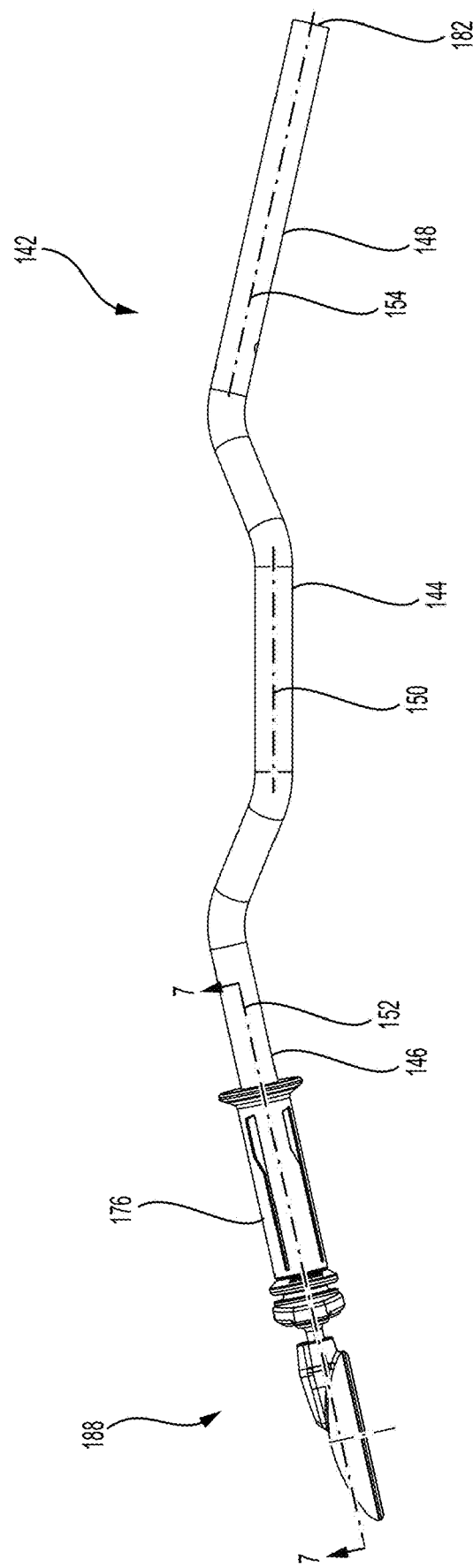
FIG. 5 is a top plan view of a handlebar, left grip and left mirror assembly of the handlebar assembly of FIG. 3.
Figure 6:
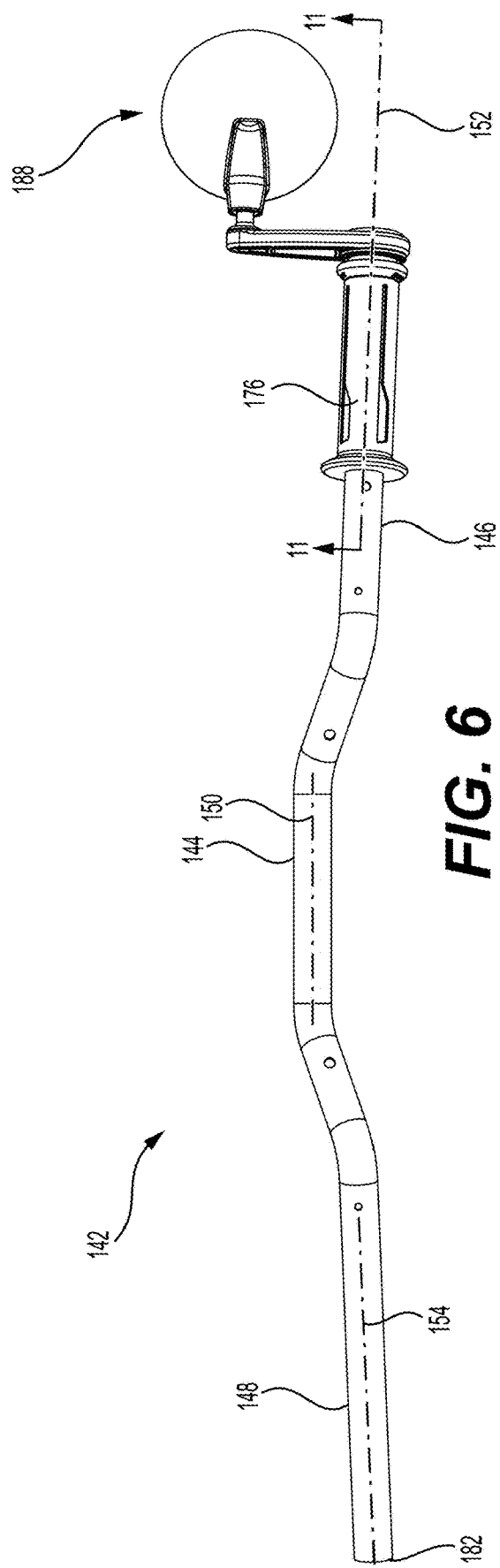
FIG. 6 is a front elevation view of the components of FIG. 5.

With reference to FIG. 2, the vehicle 100 has a steering assembly 140. The steering assembly 140 includes a handlebar assembly 141 located forwardly of the straddle seat 130. The handlebar assembly 141 includes a handlebar 142, left and right hand grips 176, 180, and left and right mirror assemblies 188, 190. The handlebar 142 has a central portion 144 as well as left and right handles 146, 148 disposed on either side of the central portion 144. The central portion 144 extends along a central handlebar axis 150. The left and right handles 146, 148 extend away from the central portion 144 along left and right handle axes 152, 154 respectively (FIG. 5). The left and right handle axes 152, 154 are angled with respect to the central handlebar axis 150. Still with respect to the handlebar assembly 141, the left hand grip 176 is disposed around the left handle 146 of the handlebar 142 near a left end 178 thereof (FIG. 3). On the opposite side, a right hand grip 180 is disposed around the right handle 148 of the handlebar 142 near a right end 182 thereof (FIG. 3). Clusters of input devices 184, 186 are located laterally inward of the left and right hand grips 176, 180, respectively. The right hand grip 180 is a motor speed input device, commonly referred to as a twistgrip 180, which allows the driver to control the speed of the motor and therefore the speed of the vehicle 100. The right hand grip 180 is pivotable with respect to the right handle 148 between an idle position and multiple actuated positions to actuate the motor speed input device. The motor speed input device is biased toward the idle position, such that when the driver of the vehicle 100 lets go of the right hand grip 180, it moves to the idle position. It is contemplated that in other embodiments, different types of motor speed input devices, such as a throttle lever, could be used and that the motor speed input device could be located elsewhere on the vehicle 100. The left and right mirror assemblies 188, 190 disposed on either side of the handlebar 142 will be described in more detail hereinbelow.

The handlebar 142 is operatively connected to the front wheels 110, 114 via a steering column 156 of the steering assembly 140. The steering column 156 is connected to the central portion 144 of the handlebar 142. The steering column 156 extends away from the handlebar 142 along a steering axis 158. The handlebar 142 is pivotable relative to the frame 108 with the steering column 156 about the steering axis 152 to steer the front wheels 110, 114 and thereby steer the vehicle 100.

In this embodiment, the steering assembly 140 of the vehicle 100 includes a track 160 extending from an upper end of the steering column 156. The track 160 is connected to the steering column 156 so as to be pivotable therewith about the steering axis 158. When the steering assembly 140 is in the straight-ahead steering position shown in FIG. 1, the handlebar 142 is centered with respect to the longitudinal centerplane 106. In this position, the track 160 extends forwardly of the steering column 156. The steering assembly 140 includes a clamp 162 tightened around the central portion 144 of the handlebar 142, holding the handlebar 142 in place. The track 160 and the clamp 162 form parts of a handlebar adjustment mechanism 164. The handlebar adjustment mechanism 164 enables the driver to adjust the position of the handlebar 142 relative to the steering column 156 to any one of a plurality of positions along an axis 166 of the track 160 between a rearmost position (shown on FIG. 2) and a forwardmost position (not shown). A display 174 is disposed on the track 160 forward of the forwardmost position of the handlebar 142. It is contemplated that, in other embodiments, the display 174 could be connected to the frame 108 of the vehicle 100. It is also contemplated that the handlebar 142 and the steering column 156 could be adjusted otherwise with respect to one another. It is also contemplated that the handlebar adjustment mechanism 164 could be omitted.

With respect to FIGS. 3 and 4, the left mirror assembly 188 will now be described in detail. As the right mirror assembly 190 is a mirror image of the left mirror assembly 188, only the latter will be described. It is contemplated that alternative embodiments of the handlebar assembly 141 may include only one of the left mirror assembly 188 and the right mirror assembly 190.

Figure 7:
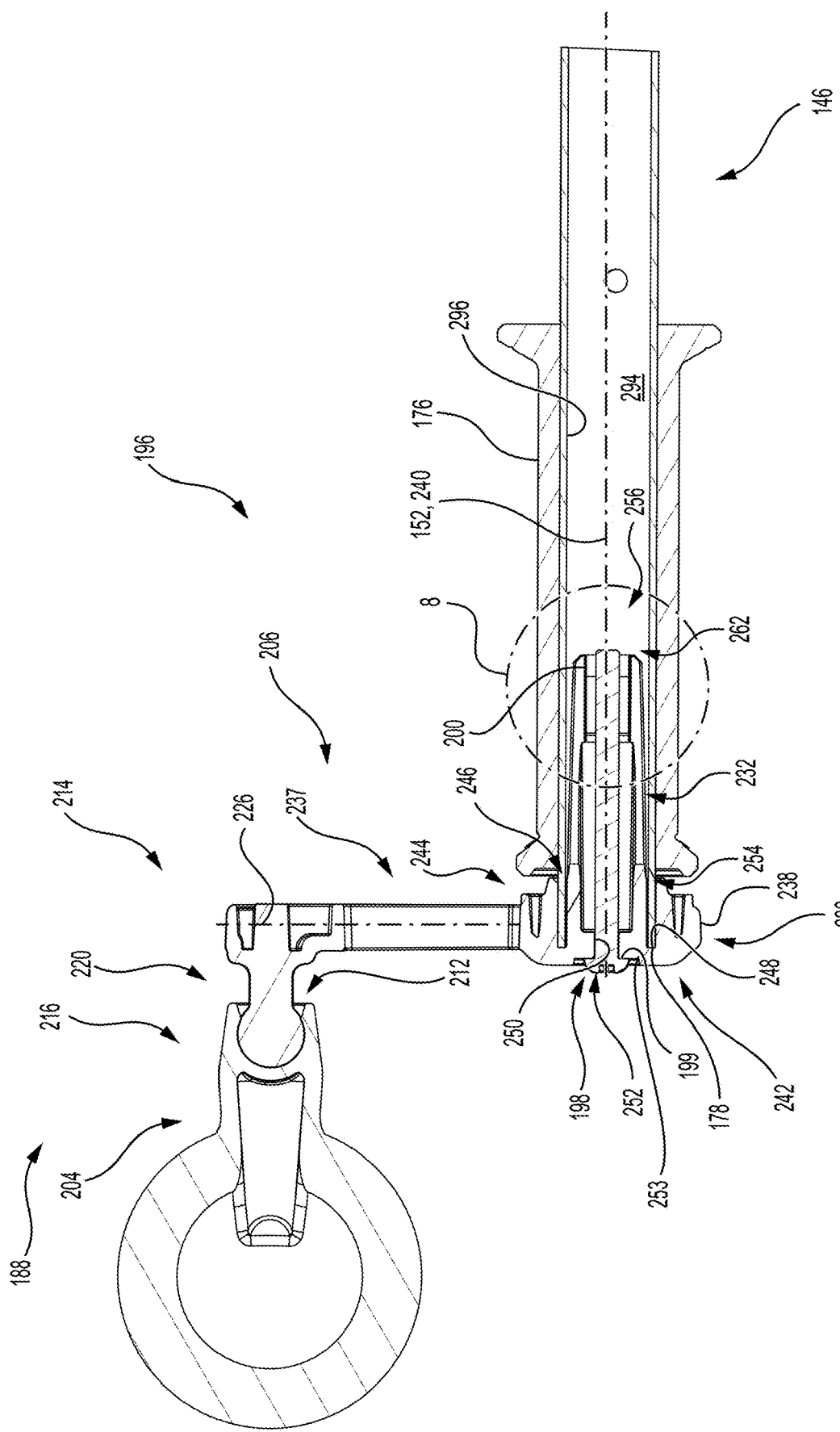
FIG. 7 is a cross-section of the components of FIG. 5 taken along section line 7-7 of FIG. 5.
Figure 8:
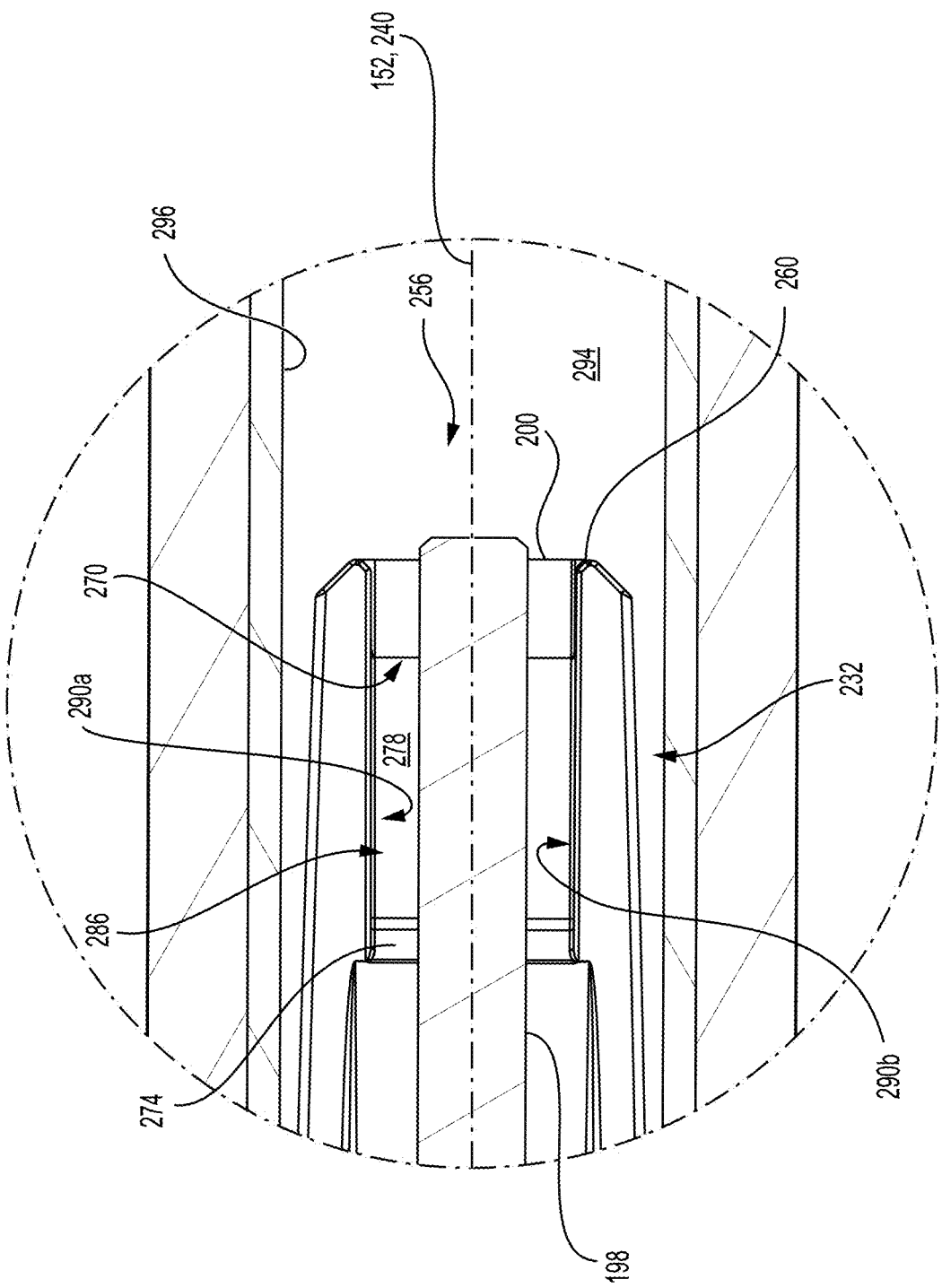
FIG. 8 is a close-up view of a portion of FIG. 7, with a nut shown in a disengaged position.

In FIG. 3, the left mirror assembly 188 is shown exploded along the left handle axis 152. The left mirror assembly 188 includes a threaded fastener 198, a nut 200, a mirror 192, a mirror housing 194 and a stem assembly 196. The threaded fastener 198 is adapted to be screwed into the nut 200. The nut 200 is a square nut 200. The mirror 192 of the present embodiment has a discoid shape, although this does not have to be the case. The mirror 192 is connected to the mirror housing 194. A circumferential ridge 202 extending from a rear surface of the housing 194 surrounds a peripheral surface of the mirror 192. The ridge 202 follows a circumferential path adapted to the shape of the mirror 192. An adhesive disposed between the rear surface of the housing 194 and the front surface of the mirror 192 retains the mirror 192 in place. Alternative means for connecting the mirror 192 to the housing 194 are contemplated. The housing 194 has a housing connector 204 disposed on its periphery. As best seen in FIG. 7, the housing connector 204 extends away from the circumferential ridge 202 toward an arm 206 of the stem assembly 196. The housing connector 204 defines a socket 212 oriented toward the arm 206. The arm 206 extends along an arm axis 226. The arm 206 has an arm connector 214 disposed at its distal end. In the present embodiment, the arm connector 214 includes a ball 216. The arm connector 214 extends toward the housing 194. The arm connector 214 is received in the housing connector 204 to form a ball joint 220. Via the ball joint 220, the housing 194 may be pivoted relative to the stem assembly 196 so as to be moved in a desired position.

Figure 4:
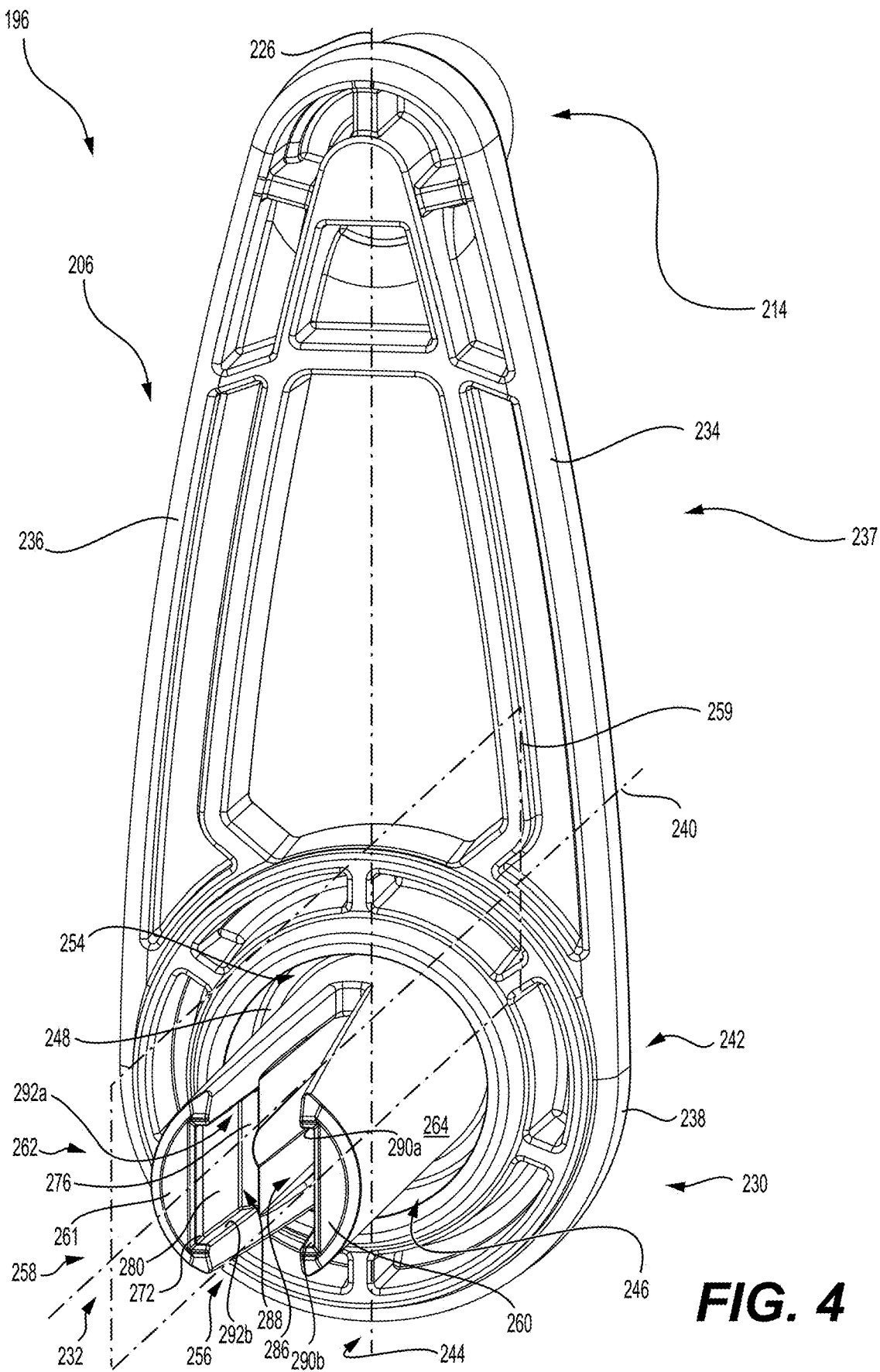
FIG. 4 is a front, top, right side perspective view of a stem assembly of a left mirror assembly of the handlebar assembly of FIG. 3.

Turning now to FIG. 4, the stem assembly 196 is presented in more detail. The stem assembly 196 includes the arm 206, a base 230 and a clamp 232 forming an integral piece. It should be noted that the stem assembly 196 is made of plastic and manufactured by injection molding, although alternative materials (e.g., metal alloys, composite materials) and manufacturing processes (e.g., additive manufacturing, milling) are contemplated. As such, it will be appreciated that other embodiments may be constructed and manufactured using any other suitable conventionally known materials and methods of manufacture. The base 230 has a knob-like shape defining a base axis 240 and having a peripheral surface 238. The arm axis 226 is oriented perpendicularly with respect to the base axis 240. In other embodiments, the arm axis 226 could be oriented with respect to the base axis 240 in an orientation other than perpendicular. The arm 206 has two elongate members 234, 236 that, together, form a stem 237. The elongate members 234, 236 extend from the peripheral surface 238 of the base 230 to the arm connector 214. A distal side 242 of the base 230 faces the same direction as the ball 216 (i.e., away from the steering axis 158). The base 230 further has a proximal side 244 opposite the distal side 242. A circular groove 246 is defined within the base 230 around the base axis 240. The groove 246 extends from the proximal side 244 toward the distal side 242. The groove 246 is sized and shaped to receive the left handle end 178. As shown in FIG. 7, when the base 230 is fully engaged with the left handle end 178, a bottom surface 248 of the groove 246 abuts the left handle end 178.

The clamp 232 extends from the proximal side 244 of the base 230. The clamp 232 has a distal end 254 connected to the base 230. The clamp 232 includes clamp portions 256, 258 disposed on either side of a plane 259 defined by the arm axis 226 and the base axis 240. As will be described below, the clamp 232 is adapted for holding the nut 200 when at least a portion of the nut 200 abuts the clamp 232 between the clamp portions 256, 258. In the present embodiment, the clamp portion 258 is a mirror image of the clamp portion 256. The clamp portions 256, 258 taper as they extend from the distal end 254 away from the base 230. The clamp portions 256, 258 each have a free end 258, 260 opposite the distal end 254. The free ends 260, 261 define a proximal end 262 of the clamp 232. Outer surfaces 264, 266 of the clamp portions 256, 258 define an imaginary frustoconical envelope (not shown) between the distal and proximal ends 254, 262 of the clamp 232. In some alternative embodiments, the clamp 232 is circumscribed by an imaginary cylindrical envelope extending between the ends 254, 262 of the clamp 232.

Figure 12:
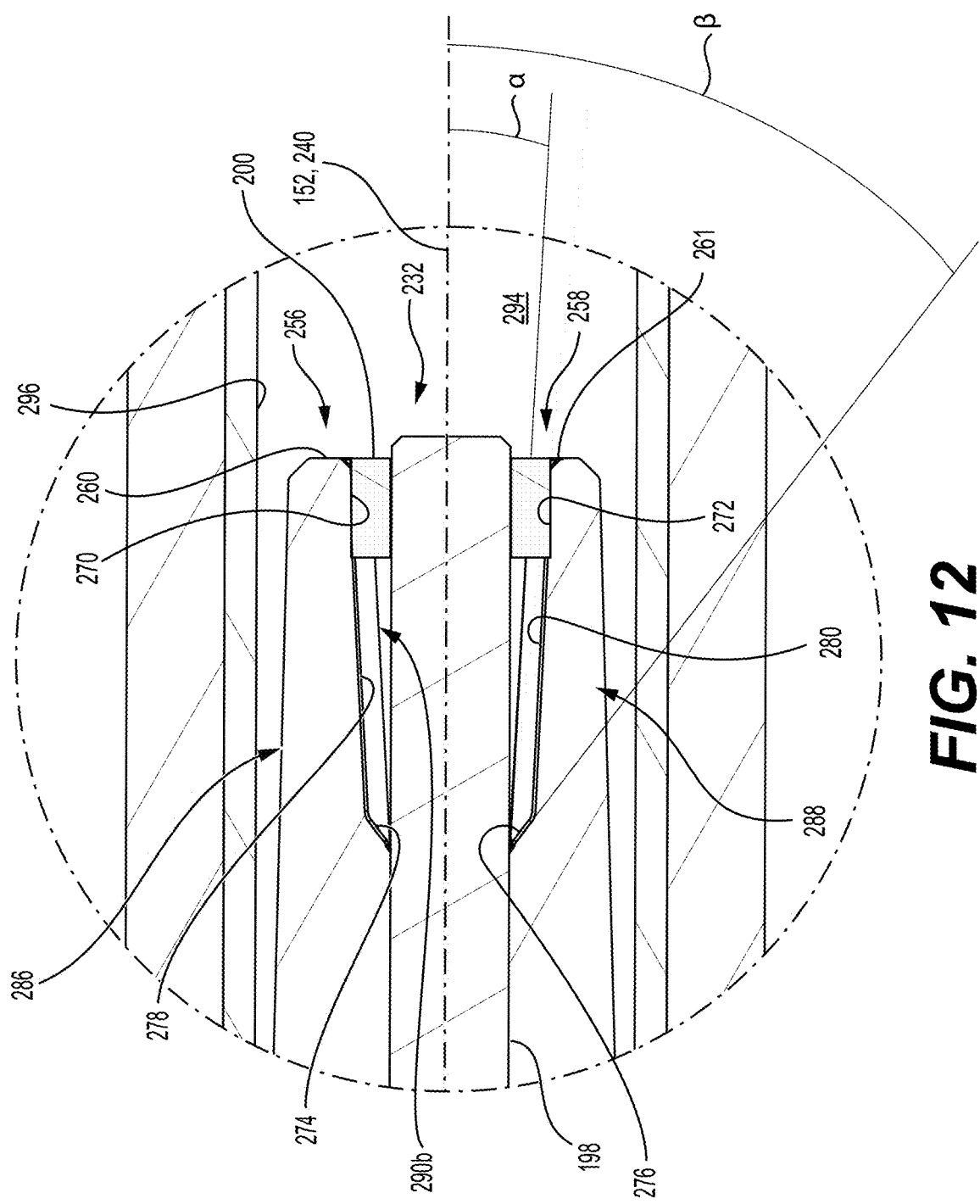
FIG. 12 is a close-up view of a portion of FIG. 11, with the nut shown in the disengaged position.

The clamp portions 256, 258 respectively include a ramp 286 and a ramp 288 disposed between the distal end 254 and the free ends 260, 261, respectively. The ramps 286, 288 taper as they extend away from the base 230. The ramp 286 includes a distal ramp surface 274 and a proximal ramp surface 278 on its inner side facing the base axis 240. The ramp 286 further includes a portion of the outer surface 264 being on its outer side opposite the distal and proximal ramp surfaces 274, 278. Similarly, the ramp 288 includes a distal ramp surface 276 and a proximal ramp surface 280 facing the base axis 240. The ramp 288 also includes a portion of the outer surface 266 being on its outer side opposite the distal and proximal ramp surfaces 276, 280. As seen in FIG. 12, the distal ramp surfaces 274, 276 extend at an angle $\alpha$ from the base axis 240 when the nut 200 is in the disengaged position. The proximal ramp surfaces 278, 280 extend at an angle $\beta$ from the base axis 240 when the nut 200 is in the disengaged position. The angle $\alpha$ is greater than the angle $\beta$. In the present embodiment, the angle $\alpha$ is 76 degrees and the angle $\beta$ is 6 degrees. In alternative embodiments, the angle $\alpha$ is between 30 degrees and 85 degrees and the angle $\beta$ is between 5 degrees and 10 degrees. Other angles are contemplated. It should be noted that the clamp portions 256, 258 are structured and arranged one with respect to the other such that when the nut 200 is held by the clamp 232 so as to abut the ramps 286, 288, the abutment rotationally fixes the nut 200 relative to the clamp 232.

Also, the clamp portions 256, 258 include a pair of lips 290a, 290b and a pair of lips 292a, 292b, respectively, extending from both sides of the ramps 286, 288 toward the base axis 240. The clamp portions 256, 258 are structured and arranged with respect to one another such that when the nut 200 is received between the ramps 286, 288, the nut 200 abuts the corresponding lips 290a, 290b, 292a, 292b, thereby preventing its rotation with respect thereto and assisting in aligning the nut 200 with respect to the ramps 286, 288. It is also contemplated that, in other embodiments, at least one of the lips 290a, 290b, 292a, 292b could be omitted.

Adjacent their ramps 286, 288, the clamp portions 256, 258 also respectively have rest surfaces 270, 272 extending from the proximal ramp surfaces 278, 280 toward the free ends 260, 261. The rest surfaces 270, 272 are parallel to the base axis 240 when the nut 200 is in the disengaged position shown in FIG. 12. The distal ramp surfaces 274, 276 extend between corresponding ones of the rest surfaces 270, 272 and the proximal ramp surfaces 278, 280.

In some embodiments, the clamp has two clamp portions being disposed in an orientation being pivoted about the base axis 240 relative to the orientation of the clamp portions 256, 258 shown in the Figures and best seen in FIG. 4.

In an alternative embodiment, the clamp has three clamp portions distributed circumferentially about the base axis 240, circumferentially spaced from each other and each of the three clamp portions has a ramp. It is also contemplated that the clamp could have more than three clamp portions. In such alternate embodiments, the nut 200 would have a corresponding number of surfaces for engaging the three or more ramps. It is also contemplated that an alternate embodiment could have one or more clamp portions with ramps and one or more clamp portions without ramps.

Figure 11:
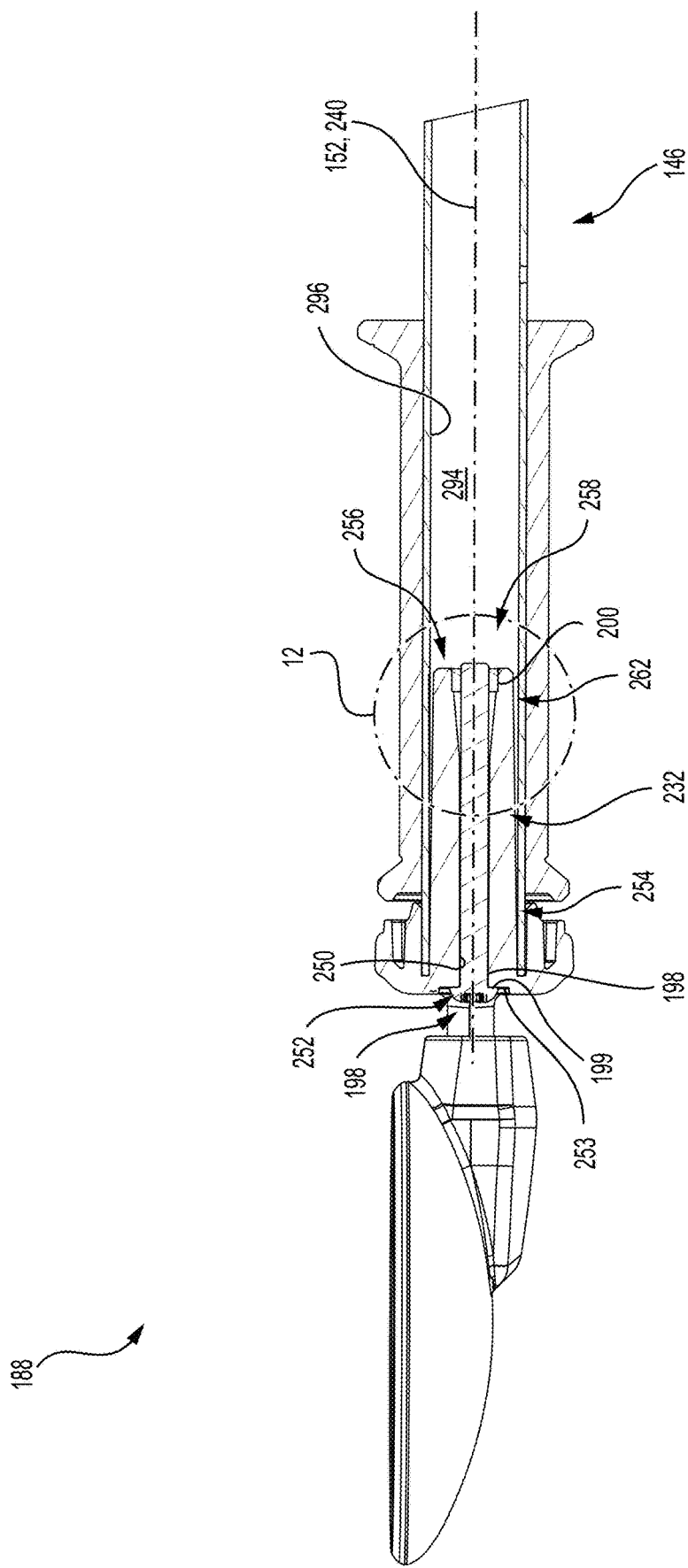
FIG. 11 is a cross-section of the components of FIG. 5 taken along section line 11-11 of FIG. 6.

With respect to FIGS. 3, 4, 7 and 11, the stem assembly 196 is adapted to receive the threaded fastener 198. An inner surface 250 of the base 230 extends from a counterbore 249 through the base, from the distal side 242 to the proximal side 244 and defines a hole 252. When the threaded fastener 198 is received by the stem assembly 196, a head 199 of the threaded fastener 198 abuts the distal side 242 of the base 230 and is received inside the counterbore 249. From the counterbore 249, the threaded fastener 198 extends between the clamp portions 256, 258 past the ramps 286, 288 (FIGS. 7, 11). In the present embodiment, the threaded fastener 198 extends past the proximal end 262 of the clamp 232 when it is received by the stem assembly 196.

With respect to FIGS. 5 to 14, the left mirror assembly 188 is shown assembled to the left handle 146 of the handlebar 142. The clamp 232 is disposed inside of a cylindrical cavity 294 defined by an inner surface 296 of the left handle 146. The cavity 294 extends along the left handle axis 152. The base 230 is engaged with the left end 178 of the left handle 146, aligning the base axis 240 with the left handle axis 152. The nut 200 is disposed inside of the cavity 294 and is held by the clamp 232. The threaded fastener 198 is received by the stem assembly 196 and screwed into the nut 200. Rotation of the threaded fastener 198 causes the nut 200 to be translated along the base axis 240 relative to the ramps 286, 288. As will now be described, translating the nut 200 toward the base 230 when the nut 200 abuts the ramps 286, 288 causes the ramps 286, 288 to deflect outward, away from the left handle axis 152 and toward the inner surface 296.

With respect to FIGS. 7, 8, 11 and 12, the nut 200 is shown in the disengaged position relative to the ramps 286, 288. In the disengaged position, the nut 200 is located alongside the rest surfaces 270, 272 between the free ends 256, 258. It is contemplated that rotating the threaded fastener 198 so as to draw the nut 200 from a position outside of the clamp 232 to the disengaged position does not cause any portion of the clamp 232 to deflect. In the disengaged position, the nut 200 fits between the proximal end of the clamp 232 and the ramps 286, 288. Further, in this position, turning the threaded fastener 198 clockwise draws the nut 200 toward an intermediate position relative to the ramps 286, 288. In some embodiments, the rest surfaces 270, 272 are omitted and the proximal ramp surfaces 278, 280 are adjacent the free ends 260, 261. In such embodiments, translating the nut 200 to at least in part inward of the free ends 260, 261 causes the nut 200 to abut the proximal ramp surfaces 278, 280, causing the ramps 286, 288 to deflect.

Figure 9:
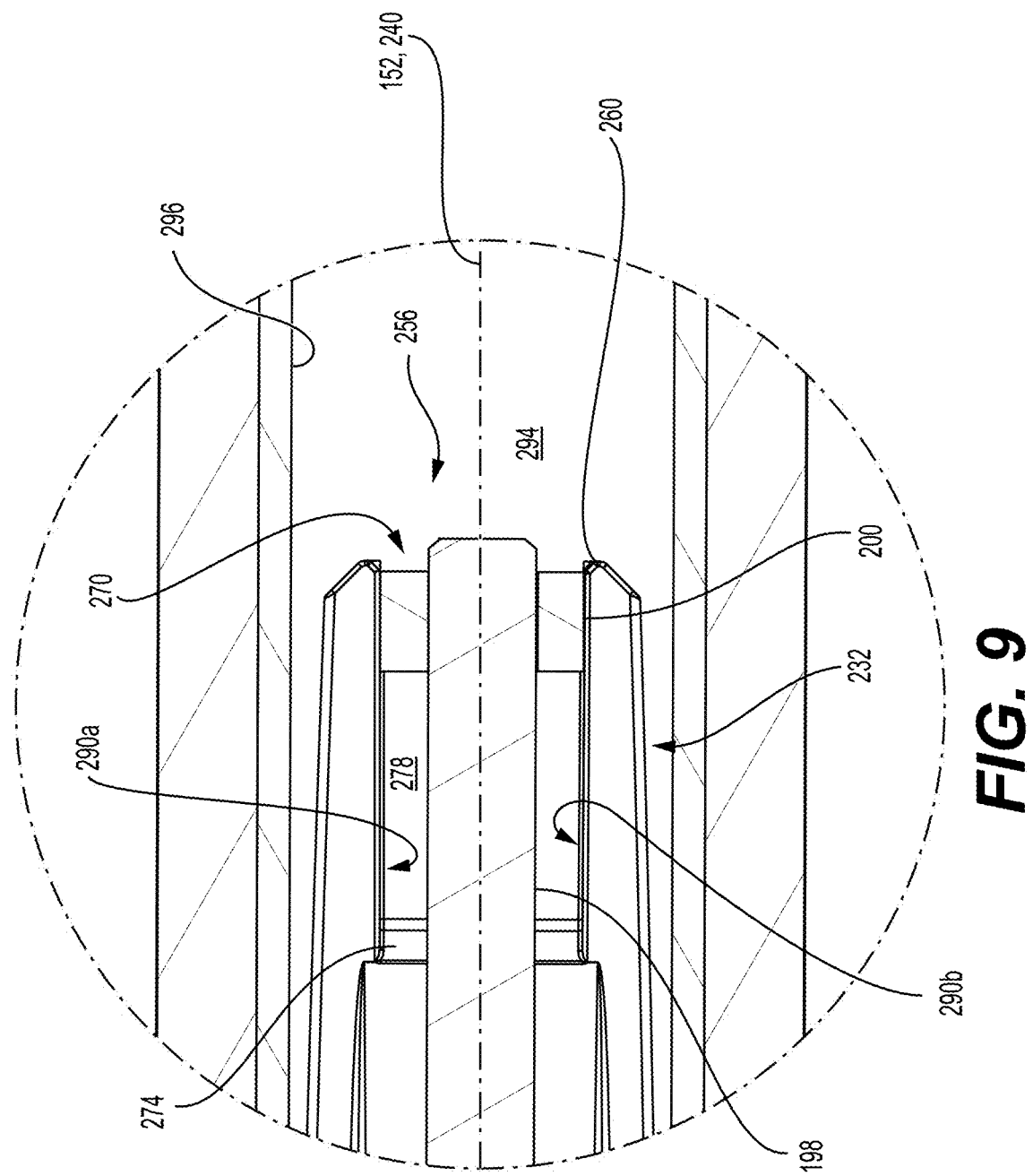
FIG. 9 is a close-up view of a portion of FIG. 7, with the nut shown in an intermediate position.
Figure 13:
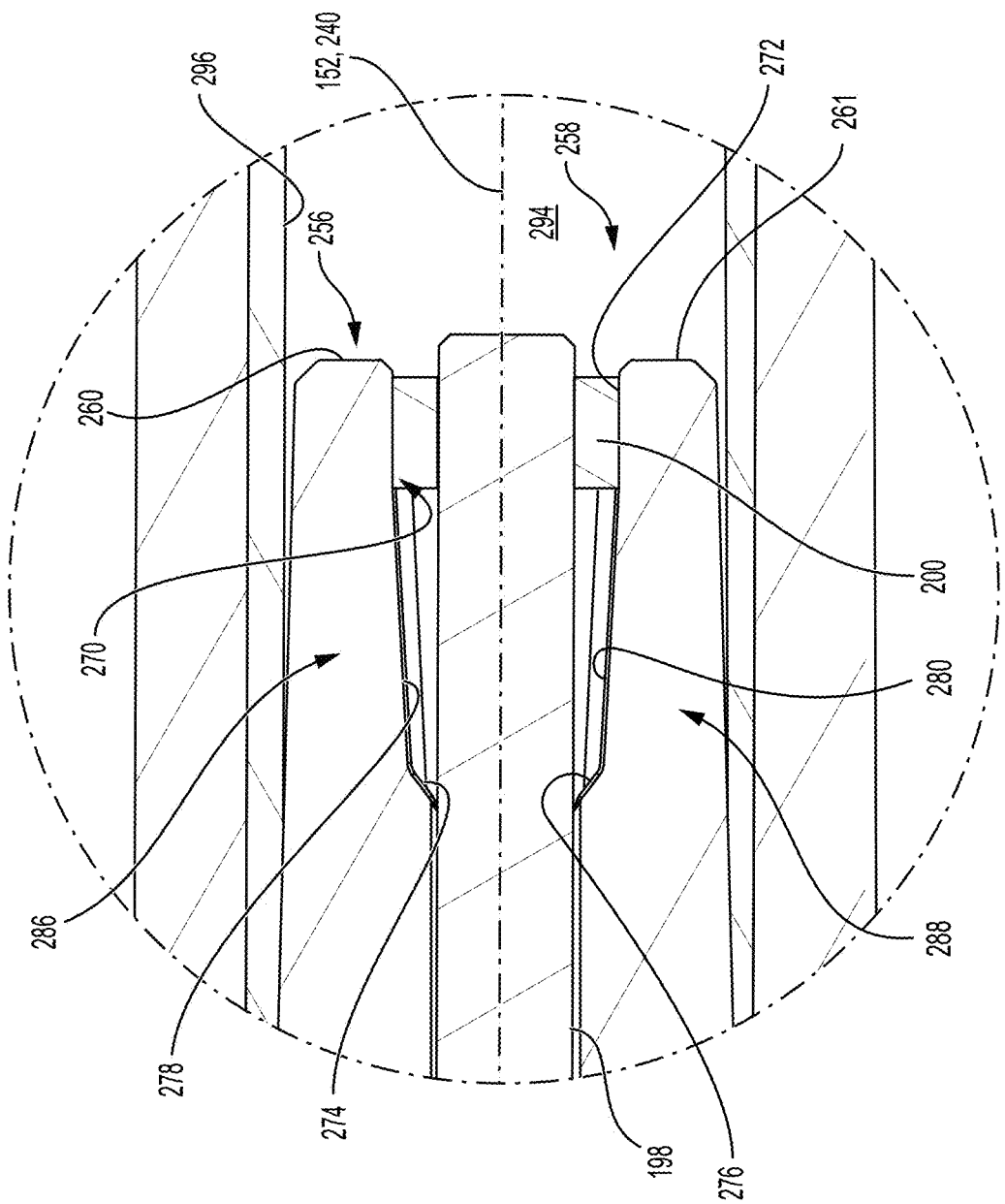
FIG. 13 is a close-up view of a portion of FIG. 11, with the nut shown in the intermediate position, the ramp being deflected.

In FIGS. 9 and 13, the nut 200 is shown in the intermediate position. In the intermediate position, a distal portion of the nut 200 is located between the proximal ramp surfaces 278, 280. In this position, the nut 200 abuts the proximal ramp surfaces 278, 280, causing the ramps to deflect. In this position, turning the threaded fastener 198 clockwise draws the nut 200 toward a clamping position relative to the ramps 286, 288. This causes the nut 200 to be translated against the proximal ramp surfaces 278, 280, causing the ramps 286, 288 to deflect further away from the base axis 240 relative to when the nut 200 is in the intermediate position shown in FIGS. 9 and 13. At some point as the nut 200 is translated toward the base 230 across the proximal ramp surfaces 278, 280, the clamp portions 256, 258 will become sufficiently deflected to engage the inner surface 296 of the handle 146 and begin to apply a clamping pressure 298 thereto (shown schematically in FIG. 14). The clamping pressure 298 will gradually increase as the nut 200 continues toward the base 230. Friction between the clamp 232 and the inner surface 296 opposes rotation of the stem assembly 196 relative to the handle 146, although the stem assembly 196 will not be fully clamped until this friction is sufficient to prevent rotation with respect to the handle 146.

Figure 10:
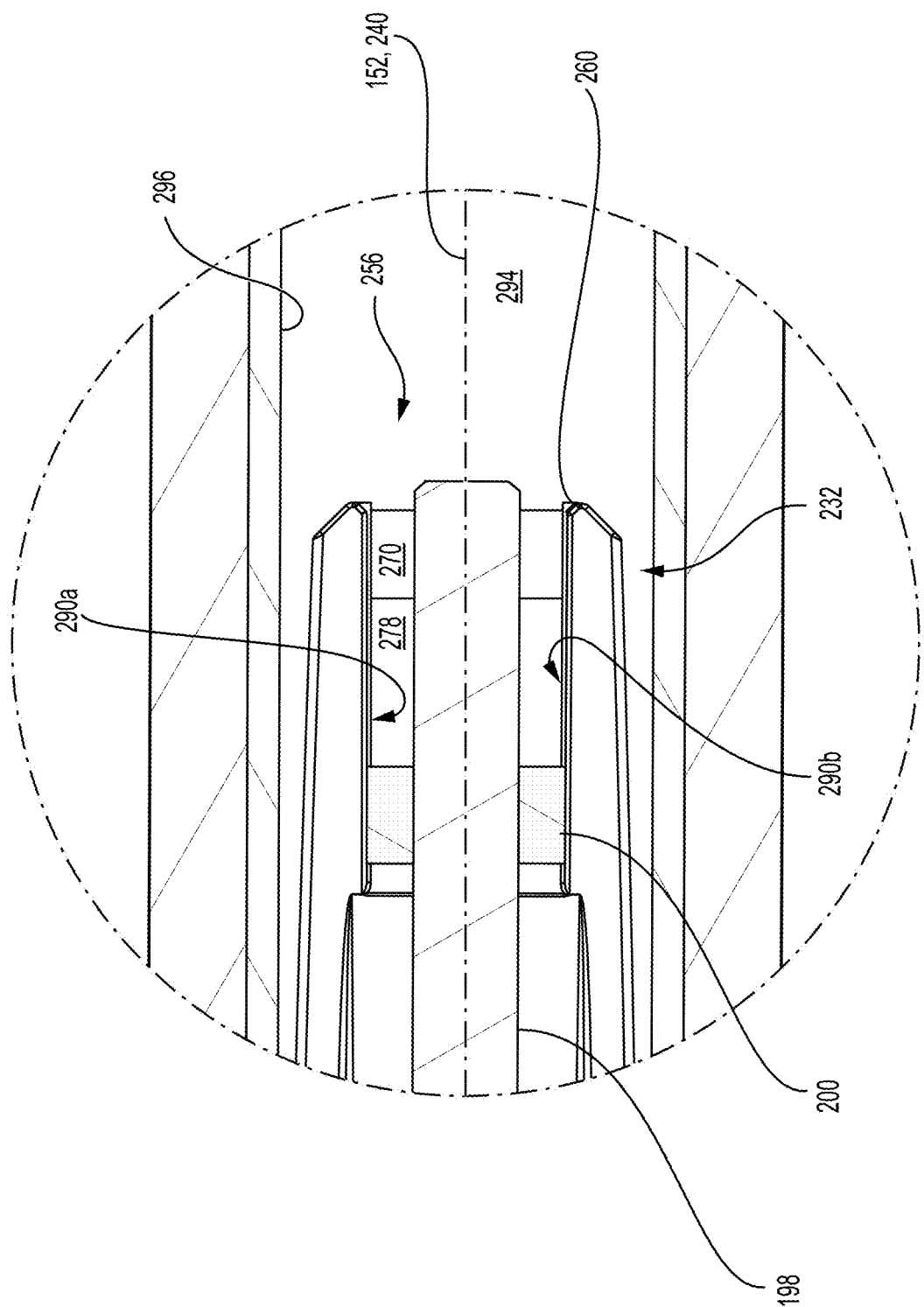
FIG. 10 is a close-up view of a portion of FIG. 7, with the nut shown in a clamping position, the ramp being deflected.
Figure 14:
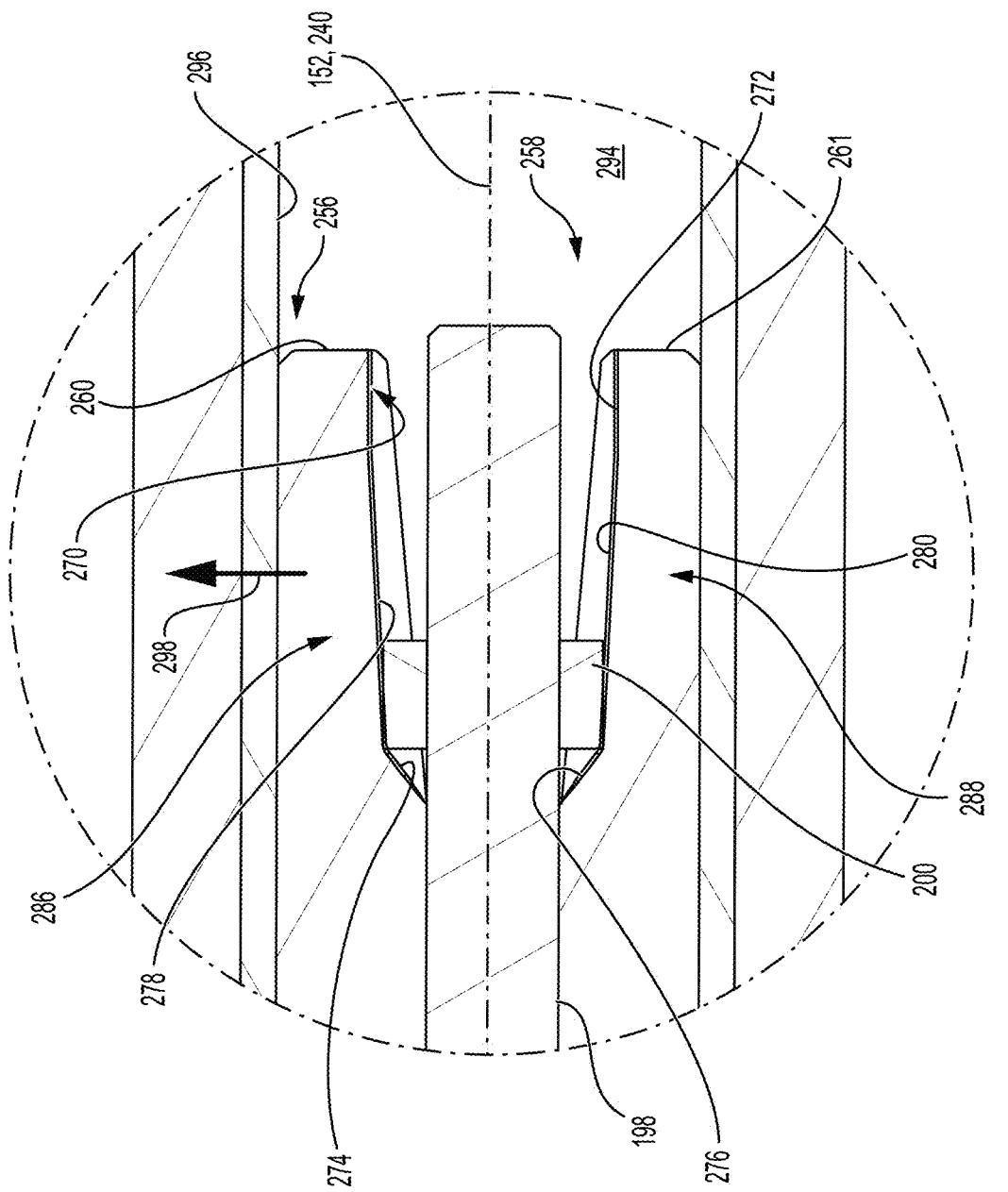
FIG. 14 is a close-up view of a portion of FIG. 11, with the nut shown in the clamping position, the ramp being deflected.

In FIGS. 10 and 14, the nut 200 is shown in the clamping position. In the clamping position, the distal portion of the nut 200 is engages the distal ramp surfaces 274, 276. The proximal portion of the nut 200 is located between the proximal ramp surfaces 278, 280. In this position, the nut 200 abuts the distal ramp surfaces 274, 276, causing deflection of the ramps 286, 288. In this position, the nut 200 is in a position being the closest to the base 230. With the nut 200 in the clamping position, the ramps 286, 288 are deflected such that the clamp 232 applies the clamping pressure 298 against the inner surface 296 via the outer surfaces 264, 266. As the nut 200 is tightened against the distal ramp surfaces 274, 276, the increase in the clamping pressure 298 is greater than when in an intermediate position and engaging the proximal ramp surfaces 278, 280, due to the angle α being much greater than the angle β. This concentrates the clamping pressure 298 to the portion of the inner surface 296 radially outward of the ramps 286, 288. The location of the clamping pressure 298 along the handle axis 152 when the stem assembly 198 is fully clamped, and more precisely its distance from the end 178 of the handlebar 142, effects how solidly the mirror assembly 141 is held in place. It will thus be appreciated that providing the distal ramp surfaces 274, 276 enables the clamping pressure to be consistently applied at a desirable location, thereby improving clamping of the mirror assembly 141.

The nut 200 is made of a material (e.g., steel) being harder than the plastic which the stem assembly 196 is made of. It should be noted that the nut 200 and the stem assembly 196 are adapted to one another such that when the nut 200 is in the clamping position and the clamp 232 applies a clamping pressure 298 against the inner surface 296, compression of portions of the ramps 286, 288 against portions of the nut 200 occurs, causing the portions of the nut 200 to impinge upon the portions of the ramps 286, 288. It is contemplated that the impingement binds the nut 200 with respect to the clamp 232, assisting in rotationally and translationally fixing the nut 200 relative to the clamp 232.

Any pressure being applied by the clamp 232 against the inner surface 296 may be relieved from the inner surface 296 by rotating the threaded fastener 198 counterclockwise, translating the nut 200 away from the base 230. When the nut 200 is in the disengaged position, the pressure is relieved, which facilitates adjusting the position of the stem assembly 196 angularly relative to the handle 146.

Further, it should be noted that the ramps 286, 288 are spaced from the base 230 such that the ramps 286, 288 are inside the grip 176 when the base 230 engages the handle end 178. This configuration allows a range for adjusting the position of the stem assembly 196 linearly relative to the handle 146 while the base 230 remains at least partially received by the groove 246 and the ramps 286, 288 remain inside of the grip 176.

It is also contemplated that the nut 200 can be positioned relative to the ramps 286, 288 in any position intermediate the positions shown.

Figure 15:
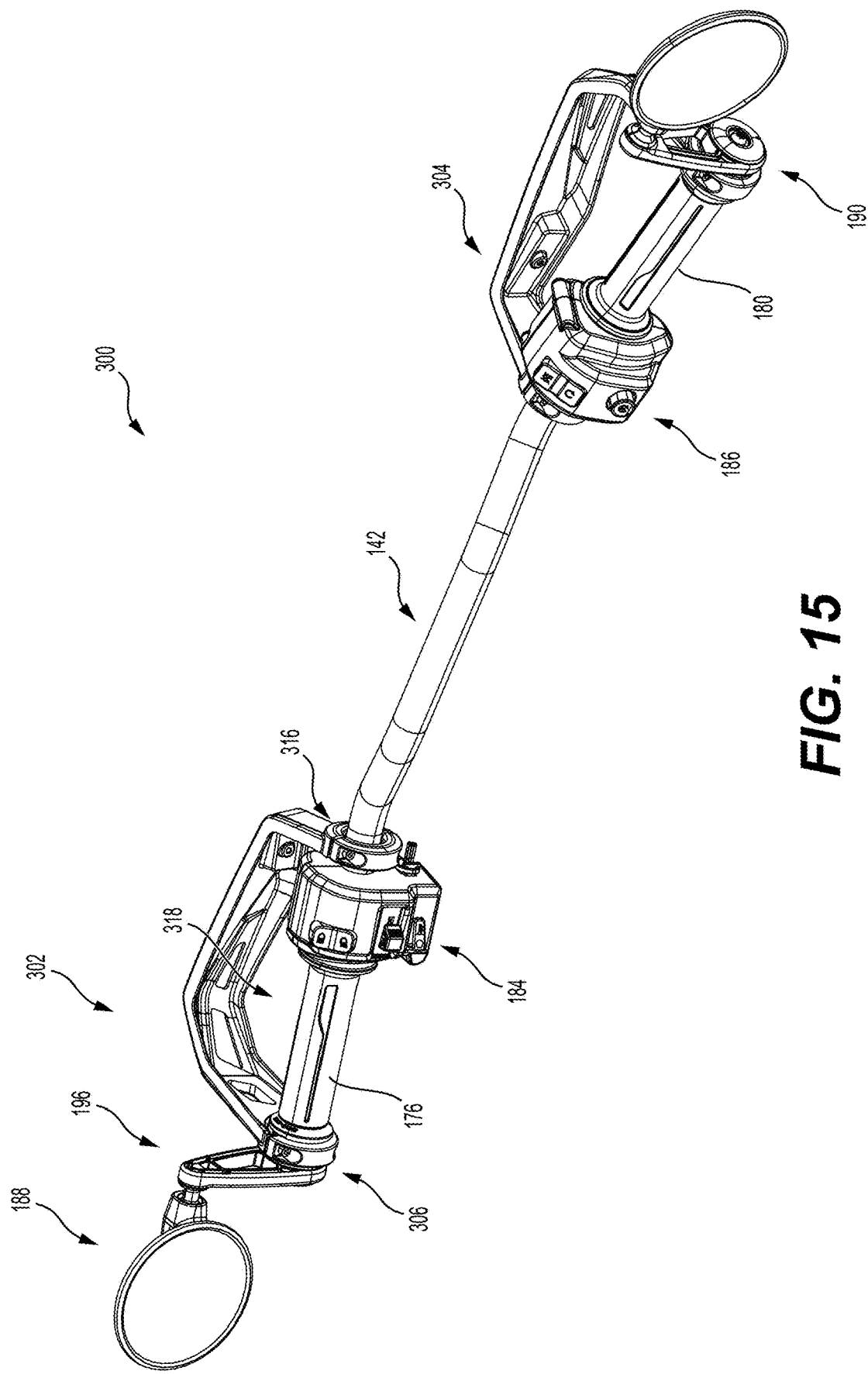
FIG. 15 is a rear, right, top side perspective view of a handlebar assembly having left and right-side mirror assemblies and left and right-side handguards.
Figure 16:
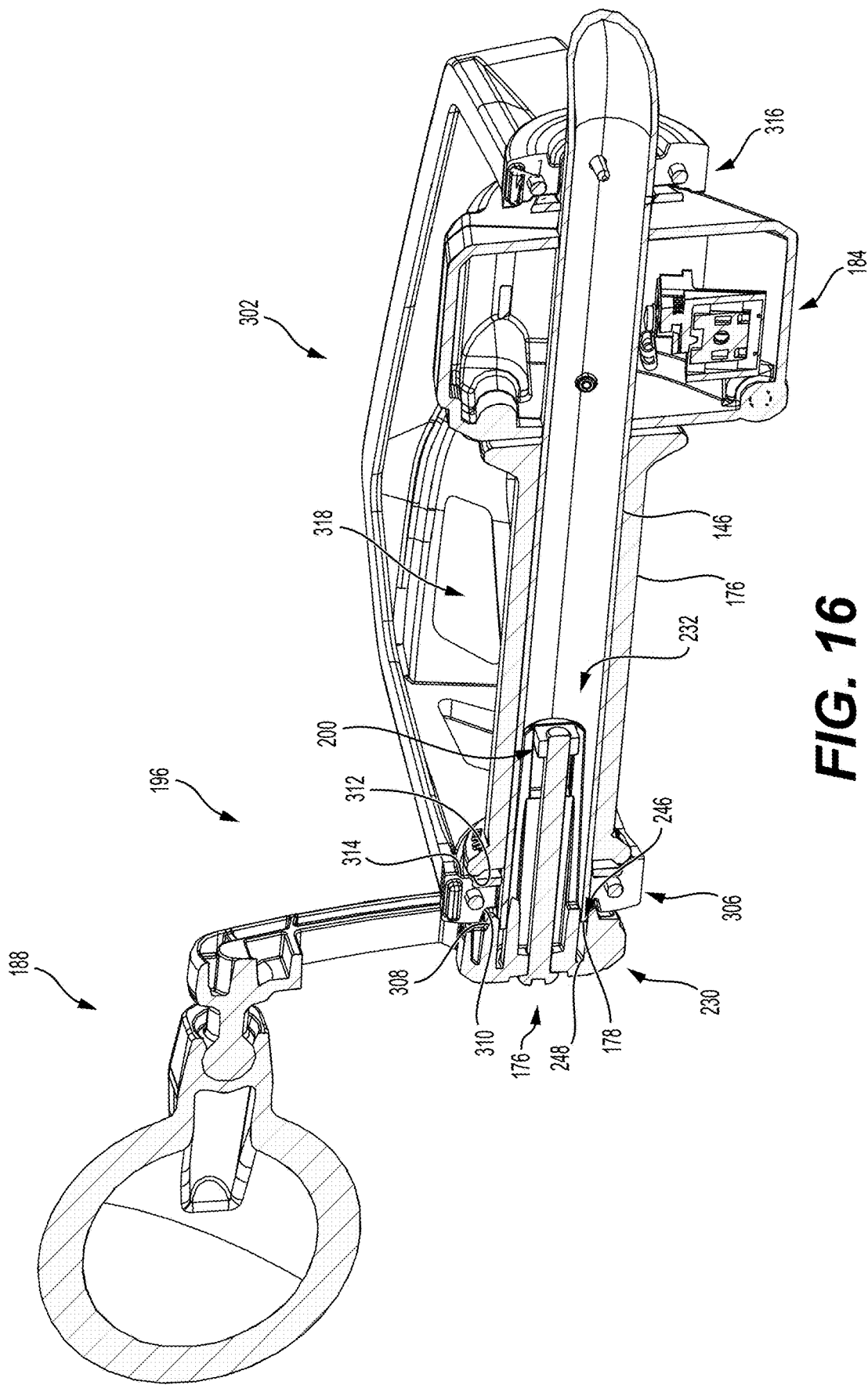
FIG. 16 is a rear, right, top side perspective cut-away view according to FIG. 15, showing portions of elements of the handlebar assembly of FIG. 15.

With reference to FIGS. 15 and 16, a handlebar assembly 300 is shown. The handlebar assembly 300 is the handlebar assembly 141 to which left and right handguards 302, 304 have been added. For simplicity, components of the handlebar assembly 300 that correspond to those of the handlebar assembly 141 have been labeled with the same reference numerals and will not be described again. Since the right handguard 304 is a mirror image of the left handguard 302, only the latter will be described.

As best seen in FIG. 16, in this embodiment, the end 178 of the left handle 146 is partially received in the groove 246. The end 178 of the left handle 146 is spaced from the bottom surface 248 of the groove 246. A handguard connector 306 is disposed around the handle 146 adjacent the base 230.

The grip 176 is disposed around the handle 146, and is separated from the base 230 by the handguard connector 306. A portion 308 of the base 230 is received in a recess 310 of the handguard connector 306. A portion 312 of the grip is received in a recess 314 of the handguard connector 306. The grip 176 abuts a distal side of the cluster of input devices 184. A handguard connector 316 is disposed around the handle 146 on an opposite side of the cluster of input devices 184. The handguard 302 is connected to the handle 146 at one end via the handguard connector 306 and at the other end via the handguard connector 316. Clamping mechanisms (not shown in detail) of the handguard connectors 306, 316 hold the handguard 302 in place. The handguard 302 is radially spaced from the grip 176. The handguard 302 and the grip 176 define a shielded volume 318 in which a portion of the hand of the driver being wrapped around the grip 176 may be shielded while driving the vehicle 100. In absence of the handguard 302 and handguard connectors 306, 316, the stem assembly 196 may be translated relative to the handle 146 such that the bottom surface 248 of the groove 246 abuts against the handle end 178 as in the handlebar assembly 141 of FIG. 7.

Modifications and improvements to the above-described embodiment of the present technology may become apparent to those skilled in the art. The foregoing description is intended to be exemplary rather than limiting.

What is claimed is:

1. A handlebar assembly for a vehicle comprising:
a handlebar adapted for connection to a steering column of the vehicle, the handlebar having first and second handles,
the first and second handles being disposed at opposite ends of the handlebar,
the first handle having an inner surface, the inner surface defining a cavity in the first handle;
a stem assembly including:
a base engaging an end of the first handle;
a stem having a first end connected to the base and a second end, the stem extending away from the base; and
a clamp extending inside the cavity, the clamp defining a ramp, the ramp tapering as the ramp extends away from the base,
the base, the stem and the clamp being formed as unit such that the base the stem and the clamp are integral;
a threaded fastener inserted through the base and extending in part in the cavity;
a nut disposed in the cavity, the nut engaging the threaded fastener, and at least a portion of the nut abutting the clamp, the nut being rotationally fixed relative to the clamp,
the nut having at least a first position and a second position relative to the ramp rotation of the threaded fastener translating the nut between the first and second positions along an axis, the nut being closer to the base in the second position than in the first position,
in the first position of the nut, the stem assembly being rotatable relative to the first handle,
in the second position of the nut, the nut abutting the ramp and causing deflection of the ramp such that the clamp applies pressure against the inner surface of the first handle, and friction between the clamp and the inner surface of the first handle opposing rotation of the stem assembly relative to the first handle; and
a mirror connected to the second end of the stem.

2. The handlebar assembly of claim 1, wherein:
the clamp has a first end connected to the base and a second free end; and
in the first position of the nut, the second free end of the clamp is radially spaced from the inner surface of the first handle.

3. The handlebar assembly of claim 1, wherein:
the base defines a groove; and
the end of the first handle is received in the groove.

4. The handlebar assembly of claim 1, wherein:
the ramp includes a first ramp surface and a second ramp surface;
the first ramp surface being at a first angle relative to the axis;
the second ramp surface being at a second angle relative to the axis;
the second angle being greater than the first angle;
the nut having a third position relative to the ramp;
the third position of the nut being intermediate the first and second positions of the nut;

in the third position of the nut, the nut abutting the first surface of the ramp; and in the second position of the nut, the nut abutting the second surface of the ramp.

5. The handlebar assembly of claim 4, wherein the first angle is between 5 degrees and 10 degrees.

6. The handlebar assembly of claim 4, wherein the second angle is between 30 degrees and 85 degrees.

7. The handlebar assembly of claim 1, wherein:
the clamp includes at least one lip extending from the ramp; and
the nut abuts the at least one lip.

8. The handlebar assembly of claim 1, wherein:
the ramp is a first ramp;
the clamp defines at least one second ramp, the at least one second ramp tapering as the at least one second ramp extends away from the base; and
in the second position of the nut, the nut abutting the at least one second ramp and causing deflection of the at least one second ramp.

9. The handlebar assembly of claim 8, wherein the first ramp and the at least one second ramp are disposed circumferentially about the axis and are circumferentially spaced from each other.

10. The handlebar assembly of claim 8, wherein:
the at least one second ramp is a single second ramp;
the first and second ramp are disposed on opposite sides of a plane passing through the axis; and
the nut is held between the first and second ramps.

11. The handlebar assembly of claim 1, wherein the mirror is connected to the second end of the stem via a ball joint.

12. The handlebar assembly of claim 1, further comprising a grip disposed around the first handle, the clamp extending inside the grip.

13. The handlebar assembly of claim 12, wherein the grip is spaced from the base; and
further comprising:
a first handguard connector connected to the first handle between the base and a first end of the grip;
a second handguard connector connected to the first handle, the grip being disposed between the first and second handguard connectors; and
a handguard connected to the first and second handguard connectors and being radially spaced from the grip.

14. The handlebar assembly of claim 13, wherein:
the first handguard connector defines a first recess and a second recess;
at least a portion of the base is received in the first recess; and
at least a portion of the grip is received in the second recess.

15. The handlebar assembly of claim 1, wherein:
the second position of the nut is a position of the nut being the closest to the base;
in the second position of the nut, the nut being spaced from the base; and
the second position of the nut is a position of the nut causing maximum deflection of the ramp.

16. The handlebar assembly of claim 15, wherein:
the clamp has a first end connected to the base and a second free end; and
in a second position of the nut, a distance between the nut and the first end of the clamp is greater than a distance between the nut and the second free end.

17. The handlebar assembly of claim 1, wherein the clamp has:
a first end connected to the base;
a second free end;
a first portion extending between the first end and the ramp; and
a second portion extending between the ramp and the second free end.

18. The handlebar assembly of claim 1, wherein:
the stem assembly is made of plastic having a first hardness; and
the nut is made of a material having a second hardness, the second hardness being greater than the first hardness.

19. A vehicle comprising:
a vehicle body;
a steering column operatively connected to the vehicle body; and
a handlebar assembly according to claim 1 connected to the steering column.

20. A mirror assembly for a handlebar of a vehicle comprising:
a stem assembly including:
a base adapted for engaging an end of a handle of the handlebar;
a stem having a first end connected to the base and a second end, the stem extending away from the base; and
a clamp having a first end connected to the base and a second free end, the clamp extending from the base, the clamp being adapted for being disposed inside a cavity defined by an inner surface of the handle, the clamp defining a ramp, the ramp tapering as the ramp extends away from the base,
the base, the stem and the clamp being formed as unit such that the base, the stem and the clamp are integral;
a threaded fastener inserted through the base and extending in part in the clamp;
a nut engaging the threaded fastener, and at least a portion of the nut abutting the clamp, the nut being rotationally fixed relative to the clamp,
the nut having at least a first position and a second position relative to the ramp, rotation of the threaded fastener translating the nut between the first and second positions along an axis, the nut being closer to the base in the second position than in the first position,
in the first position of the nut, the second free end of the clamp being at a first distance from the axis,
in the second position of the nut, the nut abutting the ramp and causing deflection of the ramp such that the second free end of the clamp is at a second distance from the axis, the second distance being greater than the first distance; and
a mirror connected to the second end of the stem.

\* \* \* \* \*